Jan. 12, 1965   J. R. MUNCK AF ROSENSCHÖLD   3,165,116
AUTOMATIC VALVE ASSEMBLIES
Filed July 11, 1961
2 Sheets-Sheet 1

INVENTOR:
John Rutger Munck af Rosenschöld
BY
ATTORNEY

Jan. 12, 1965   J. R. MUNCK AF ROSENSCHÖLD   3,165,116
AUTOMATIC VALVE ASSEMBLIES
Filed July 11, 1961                                       2 Sheets-Sheet 2
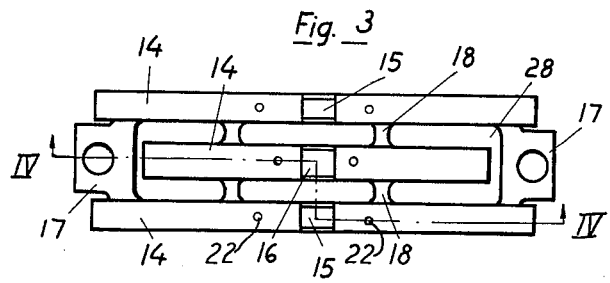
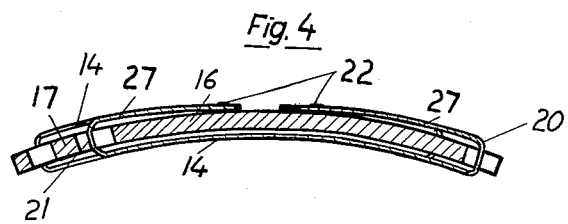
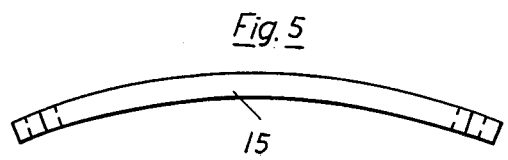
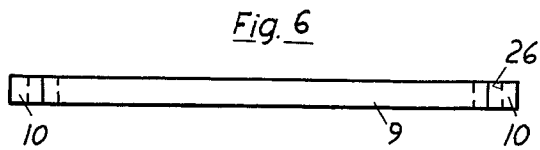
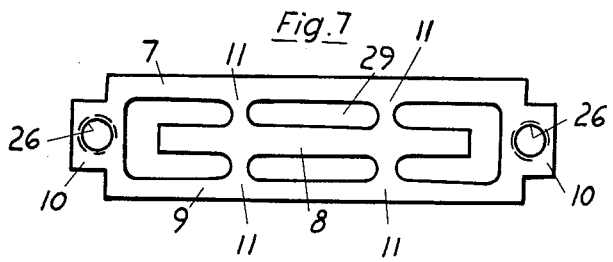
INVENTOR
John Rüdger Munck af Rosenschöld
BY
ATTORNEY

United States Patent Office 3,165,116
Patented Jan. 12, 1965

3,165,116
AUTOMATIC VALVE ASSEMBLIES
John Rutger Munck af Rosenschöld, Saltsjobaden, Sweden, assignor to Atlas Copco Aktiebolag, Nacka, Sweden, a corporation of Sweden
Filed July 11, 1961, Ser. No. 123,137
5 Claims. (Cl. 137—512.1)

This invention relates to automatic valve assemblies for machines having a cylinder and a piston reciprocating therein. One object of the invention is to provide an automatic valve assembly which may be used as a suction valve or as a pressure valve for such a machine. A further object of the invention is to provide a valve assembly in which the valve means are very light and make very little resistance to the fluid flow through the valve assembly. A further object of the invention is to provide a valve assembly which may be built into a reciprocating machine and which results in a very small clearance space and consequently in a high efficiency of the machine.

For the above and other purposes I provide a valve assembly comprising a valve guard formed by parallel ribs spaced apart to form passages therebetween and connected to anchoring portions at each end of the guard for securing said guard to a cylinder structure provided with a valve seat, valve strips extending freely over one face of said ribs and bent around the ends of the ribs and extending over the opposite face of the ribs and secured to the ribs remote from the ends of the ribs, the portion of the strips at said one face of the ribs forming valve means and the portions of the strips at said opposite face forming valve spring means for biasing said valve means towards said valve seat and also forming means for guiding the valve means during its motion.

In the accompanying drawings automatic valve assemblies according to the invention are illustrated by way of example in connection with a cylinder of a reciprocating compressor, but the valve assemblies according to the invention may naturally be used as suction valves for internal combustion engines or for other purposes.

Figure 1:
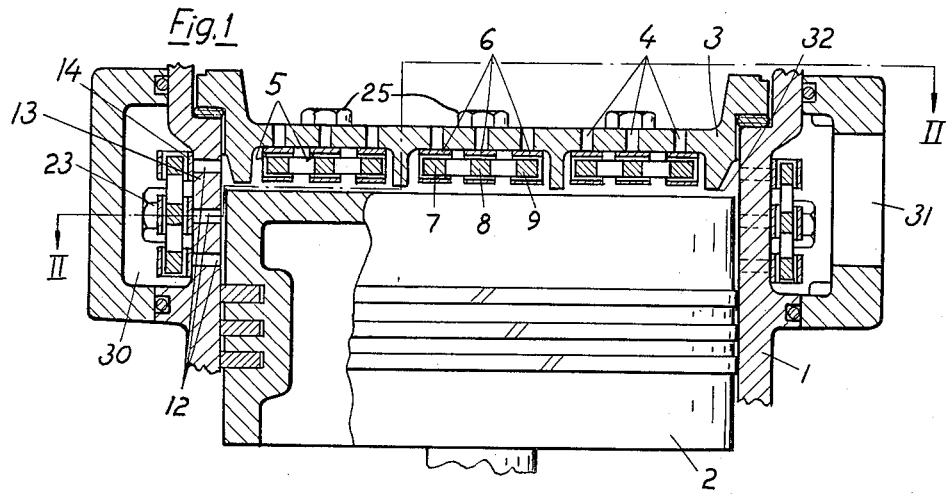
Figure 2:
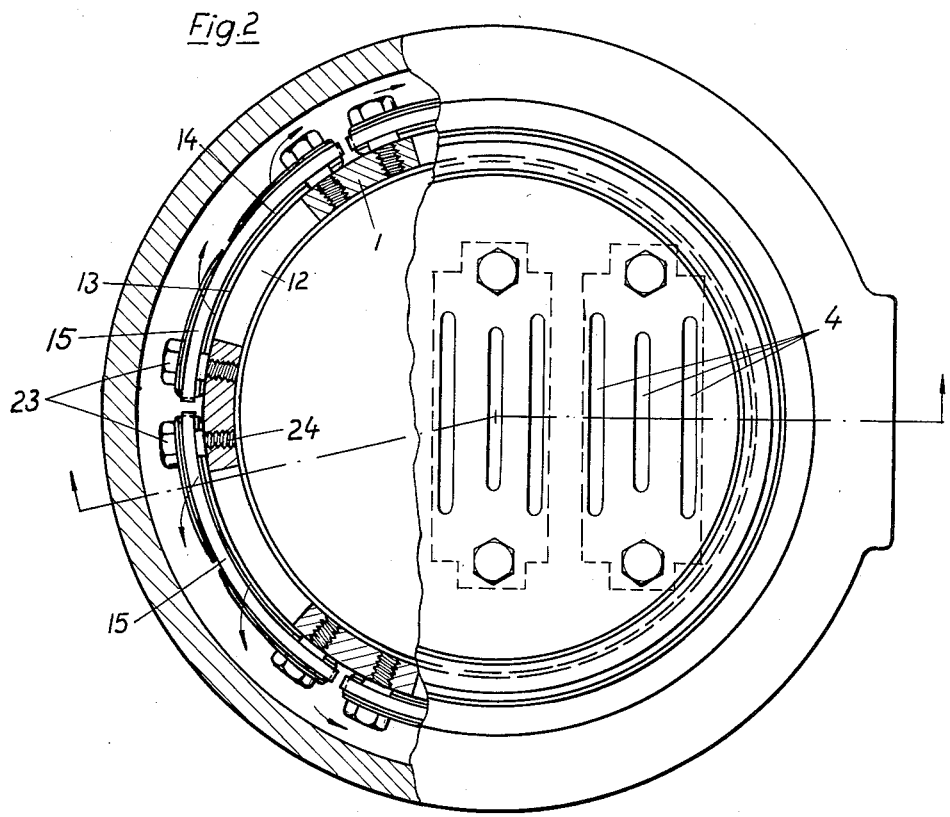

In the drawings FIG. 1 is an axial section and partial side elevation of the top of a cylinder and piston of a reciprocating compressor. FIG. 2 is a section on line II—II in FIG. 1. FIG. 3 is an elevation of an arcuate valve assembly incorporated in the compressor illustrated in FIGS. 1 and 2. FIG. 4 is a section on lines IV—IV in FIG. 3 and FIG. 5 is a side view of the arcuate valve guard of the valve assembly in FIGS. 3 and 4. FIG. 6 is a similar side view of a flat valve guard and FIG. 7 is a plan view of the valve guard in FIG. 6.

In FIGS. 1 and 2, 1 designates the top of a compressor cylinder and 2 a piston reciprocable in said cylinder. The cylinder 1 is provided with a cylinder head 3 which may be clamped or bolted to the top of the cylinder 1 in any suitable manner and which is provided with a number of parallel inlet opening slots 4 forming passages through the cylinder head 3. At the inside of the cylinder head 3 valve seats 5 are formed in which valve seats and slots 4 open. With the valve seats 5 cooperate strip valve means 6 preferably of thin resilient rolled spring steel or other suitable material. The valve strips are carried by flat valve guards formed by ribs 7, 8, 9 illustrated in detail in FIGS. 6 and 7. The outer parallel ribs 7 and 9 of each valve guard are made integral with anchoring portions 10 at the ends of the valve guards and carry between them the central rib 8 connected to the ribs 7, 9 by means of webs 11.

The upper portion of the cylinder wall 1 is provided with peripherally extending slots 12 forming discharge passages for the air compressed by the piston 2 in the chamber 32. The slots 12 form a cylindrical valve seat 13 extending around the top of the cylinder 1 and cooperate with arcuate valve strips 14 which are bent to conform with the shape of the valve seat 13, which may naturally be carried out separate from the cylinder wall 1. The valve strips 14 are carried by arcuate valve guards formed by arcuate ribs 15, 16 the outer ribs 15 of which are made integral with anchoring portions 17 at the ends of the guards and carry the central rib 16 by means of webs 18 similarly to the illustration in FIG. 7. The valve strips 14 which may also be of leaf spring steel or other suitable resilient material extend along the inner surface of the arcuate valve guard ribs 15, 16 and are bent around the ends of the valve guard ribs as indicated at 20 and 21 in FIG. 4 and extend further along the rear side of the valve guard ribs and are secured to the valve guard ribs remote from the ends of the ribs as at 22, preferably by spot welding. The anchoring portions 17 are secured to the cylinder wall 1 by means of bolts 23 which are screwed into the cylinder wall as indicated at 24 and secure the guards at a proper distance from the seat 13. The valve guards 7, 8, 9 are secured to the cylinder head 3 by means of bolts 25 which are screwed into screw threaded openings 26 in the anchoring portions 10 of the flat valve guards 7, 8, 9.

The valve strips 6 and 14 are made of thin resilient material and are therefore extremely light and the spring portions 27 of the valve strips form very soft springs so that the valve strips are easily movable towards and away from the valve seats and consequently make little resistance to the air flow through the valve assemblies. The openings 28, 29 between the valve strips form ample passages for the air so that air velocities through the valve assemblies may be kept at a low value. The air discharged through the arcuate valve assemblies at the periphery of the cylinder is conveyed through an annular passage 30 to the compressor air discharge opening 31. The arrangement of the peripherally extending slots 12 at the end of the cylinder wall results in concentrated discharge openings of large area close to the top of the cylinder so that the clearance space is reduced to a minimum and simultaneously the slots do not reduce materially the strength of the cylinder.

The valve assemblies above described should only be considered as examples and may be modified in various different ways within the scope of the claims.

What I claim is:
1. A self-contained spring blade valve assembly for opening and closing inlet or outlet ports in the cylinders of piston compressors, internal combustion engines, and the like, which comprises a plurality of parallel rigid ribs for disposition overlying said ports and spaced apart forming passages therebetween, said ribs being all formed together as a thin metal piece and connected together as a single unit by a plurality of transverse spaced webs between adjacent said ribs, fastening means at each opposite end of said single unit for affixing said unit in operating position and forming substantially the sole connection between said valve assembly and a cylinder inlet or outlet port on which it is disposed, spring blade valve strips continuously and freely overlying one face of each of said ribs and movable toward and away from said ribs in a substantially straight line and continuously parallel to said ribs for forming the valving means for opening and closing said ports, each of said valve strips being longer than its respective said ribs and being bent loosely around each opposite end thereof forming a spring portion overlying a substantial length of the opposite face of said rib, and means for affixing each opposite end of said valve strips to said opposite face of said ribs at points inwardly spaced from the ends thereof with said bent and affixed portions of said valve strips forming with said opposite face of said ribs substantially the sole resilient springing and guiding means for said movement of said strip for opening and closing said ports, said unit and said valve strips thereon forming a complete and unitary substantially thin valve assembly for affixing to said cylinder inlet or outlet ports and in which the greatest thickness of said entire unit is defined by merely said bent portions of said valve strips at the opposite ends of said ribs.

2. A valve assembly as recited in claim 1 in which said ribs and said valve strips thereon conform to an arcuate configuration for disposition adjacent an arcuate port in the circumferential wall of a cylinder.

3. A valve assembly as recited in claim 1 in which said ribs and said valve strips thereon are substantially flat for disposition adjacent a port in a flat portion of a cylinder.

4. A valve assembly as recited in claim 1 in which each of said strips is formed substantially entirely of a continuous length of flat metal spring of substantially uniform width and thickness throughout.

5. A self-containing spring blade valve assembly for opening and closing inlet or outlet ports in the cylinders of piston compressors, internal combustion engines, and the like, which comprises two outer-spaced ribs affixed together adjacent the opposite ends thereof, and at least one intermediate rib disposed between said two outer ribs and affixed thereto at points therealong inwardly spaced from the ends thereof, said ribs being formed together as a single unit, fastening means at each opposite end of said single unit for affixing said unit in operating position and forming substantially the sole connecton between said valve assembly and a cylinder on which it is disposed, spring blade valve strips continuously and freely overlying one face of each of said ribs and movable with respect thereto forming the valving means for opening and closing said ports, each of said valve strips being longer than its respective said rib and being bent around each opposite end thereof forming a spring portion overlying the opposite face of said rib, and means for affixing each opposite end of said valve strips to said opposite face of said ribs at points inwardly spaced from the ends thereof with said bent and affixed portions of said valve strips forming with said opposite face of said ribs substantially the sole resilient springing and guiding means for said movement of said strip for opening and closing said ports.

References Cited in the file of this patent
UNITED STATES PATENTS

| | | |
|---|---|---|
| 85,510 | Critchlow | Jan. 5, 1869 |
| 668,405 | Holden | Feb. 19, 1901 |
| 756,869 | Mansfield | Apr. 12, 1904 |
| 792,788 | Preliwitz | June 20, 1905 |
| 1,145,114 | Bryen | July 6, 1915 |
| 1,607,324 | Voss | Nov. 16, 1926 |
| 1,637,821 | Heideman | Aug. 2, 1927 |
| 2,503,896 | Yount | Apr. 11, 1950 |
| 2,599,499 | Thorstenson | June 3, 1952 |
| 2,848,157 | Ayling | Aug. 19, 1958 |
| 2,970,608 | Doeg | Feb. 7, 1961 |

FOREIGN PATENTS

| | | |
|---|---|---|
| 22,739 | Great Britain | Oct. 13, 1896 |
| 691,832 | Germany | June 6, 1940 |